3,461,119
STEROIDO - 9α - HALOGEN - 11β - HYDROXY-[17α, 16α-d] - 2' - ALKYLOXAZOLINES OF THE PREGNANE SERIES
Giangiacomo Nathansohn and Giorgio Winters, Milan, Italy, and Emilio Testa, Vacallo, Tessin, Switzerland, assignors to Lepetit S.p.A., Milan, Italy
No Drawing. Filed Dec. 30, 1966, Ser. No. 606,015
Claims priority, application Great Britain, Jan. 11, 1966, 1,257/66; July 11, 1966, 31,056/66; Sept. 29, 1966, 43,628/66
Int. Cl. C07c 173/10; A61k 27/00
U.S. Cl. 260—239.55                 7 Claims

ABSTRACT OF THE DISCLOSURE

The invention relates to steroido-9α-halogen-11β-hydroxy-[17α,16α-d]-2'-alkyloxazolines of the pregnane series which have been found to possess antiinflammatory and hormone-like activity.

---

This invention is concerned with new steroids and a process for preparing them. More particularly, the compounds with which this invention is concerned are steroido-oxazolines of the formula

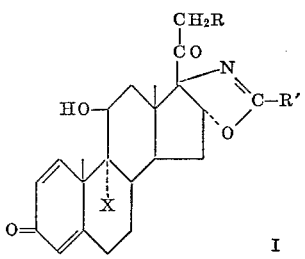

wherein R represents hydrogen, hydroxy and acyloxy groups, R' represents hydrogen, lower alkyl and phenyl and X represents fluorine and bromine.

The compounds display a very high antiinflammatory activity, which has been ascertained by the granuloma pellet test in rats. In this respect, the new steroids are superior in activity to other well known and therapeutically used steroidal antiinflammatory compounds of comparable structure. The hormone-like activity as glucocorticoids and mineral-corticoids is also of a very high degree.

The process for the preparation of the new steroido-oxazolines starts from a pregna-1,4,9(11)-triene-3,20-dione-[17α,16α-d]-oxazoline of Formula II which is treated with N-bromoacetamide in the presence of perchloric acid in an inert organic solvent, giving a 9α-bromo-11β-hydroxy derivative (I above, in which X is bromine). This is dissolved in an organic solvent and treated at a temperature of 0–5° C. with a water solution of sodium hydroxide under vigorous stirring. The obtained 9β,11β-epoxide (III) is then treated with hydrofluoric acid in an inert organic solvent at 0–5° C. giving the 9α-fluoro-11β-hydroxy derivative (I above, in which X is fluorine).

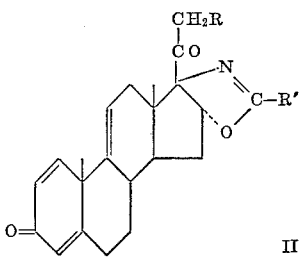

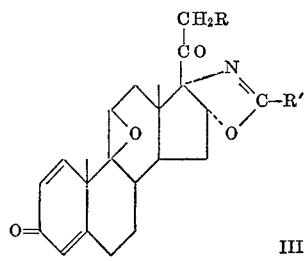

The starting pregna-1,4,9(11)-triene-3,20-dione-[17α,16α-d]-oxazolines can be in turn prepared through different ways, which are well known to all those skilled in steroid chemistry. In order to better illustrate the possibilities of preparation of the starting compounds the appended examples are provided also with some directions useful for their preparation. Alternative routes, however, can be easily found by competent people. We have obtained excellent results by using the following steps, when 21-oxygenated steroids were desired:

5α-pregnane-3β,11β-diol-20-one-[17α,16α-d]-oxazoline 3-acylate
5α-pregn-(9,11)-ene-3-ol-20-one-[17α,16α-d]-oxazoline
5α-pregn-9(11)-ene-3,21-diol-20-one-[17α,16α-d]-oxazoline 21-acylate
5α-pregn-9(11)-ene-21-ol-3,20-dione-[17α,16α-d]-oxazoline 21-acylate
pregn-9(11)-ene-2,4-dibromo-21-ol-3,20-dione-[17α,16α-d-]-oxazoline 21-acylate
pregna-1,4,9(11)-triene-21-ol-3,20-dione-[17α,16α-d]-oxazoline 21-acylate.

Of course, when 21-non-oxygenated end compounds are desired, the steps by which the 21-acyloxy (or 21-hydroxy) group is introduced are omitted.

The following examples are indicative of the process of the invention as well as of the processes for preparing the steroido-oxazolines useful as starting compounds.

EXAMPLE 1

Pregna-1,4-diene-9α-fluoro-11β,21-diol-3,20-dione-[17α,16α-d]-2'-methyloxazoline To a solution of 2.4 g. of pregna-1,4,9(11)-triene-21-ol-3,20-dione-[17α,16α-d]-2'-methyloxazoline 21-acetate in 24 ml. of tetrahydrofuran, 12.8 ml. of 0.46 N perchloric acid are added at 15° C. under stirring. N-bromoacetamide (1.1 g.) is then added to the mixture which is kept well far from light, and stirred for 4 hours at room temperature. After lowering the temperature to 10° C. a saturated solution of sodium bisulfite is added in order to decolorize the mixture, which is then poured into 120 ml. of ice-water. A product separates, which is collected by filtration, washed with water and then dried, thus obtaining 2.81 g. of crude 9α-bromo-pregna- 1,4-diene-11β,-21-diol - 3,20 - dione-[17α,16α-d]-2'-methyloxazoline 21-acetate (yield 93%), M.P. 175–176° C. An amount of 2.75 g. of 9α-bromo-pregna-1,4-diene-11β,21-diol-3,20-dione-[17α,16α-d]-2'-methyloxazoline 21-acetate is dissolved under nitrogen in 137 ml. of a mixture methanol: chloroform (3:2). The solution is put in ice bath and 5.5 ml. of 1 N NaOH are then added within 10 minutes followed by 5.5 ml. within the next 40 minutes. A strong stirring is provided for 2 hours and the temperature is kept between 0–5° C., then the pH is adjusted to 7–8 with glacial acetic acid. The solvent is evaporated in vacuo to 20 ml. of volume of solution, that is poured into ice-water (130 ml.). The product is collected by filtration, washed with water and dried. Yield: 1.6 g. (80%), M.P. 221–222° C. It is pregna-1,4-diene-9β,11β-epoxy-21-ol-3,20-dione-[17α,16α-d]-2'-methyloxazoline.

An amount of 1 g. of said product is dissolved in 9.4 ml. of a mixture obtained by mixing 4.67 ml. of hydrofluoric acid with 8.5 ml. of tetrahydrofuran at the temperature of 0° C. This solution is stirred for 20 hours at the same temperature, then under strong stirring and cooling 20 ml. of tetrahydrofuran are added. The solution is subsequently neutralized by the addition of 24 g. of sodium bicarbonate followed by 1 g. of sodium sulfate. The inorganic substance is collected and washed with ethyl acetate. The filtrate is evaporated to dryness and the product is crystallized from acetone: 0.65 g. (yield 61%) of pregna-1,4-dien - $9\alpha$ - fluoro-$11\beta$,21-diol-3,20-dione-[$17\alpha$,$16\alpha$-d]-2'-methyloxazoline are obtained, M.P. 241–244° C. $[\alpha]_D = +83.5$ (c. 0.5, $CHCl_3$). The 21-acetate has M.P. 252–255°C. $[\alpha]_D = +54.8$ (c. 0.5, $CHCl_3$).

Preparation of the starting compound, pregna-1,4,9(11)-triene-21-ol-3,20-dione-[$17\alpha$,$16\alpha$-d]-2'-methyloxazoline 21-acetate An amount of 22.45 g. of $5\alpha$-pregnane-$3\beta$,$11\beta$-diol-20-one-[$17\alpha$,$16\alpha$-d]-2'-methyloxazoline 3-acetate are dissolved at 60° C. in 131.5 ml. of dimethylformamide and 44 ml. of collidine. The mixture is cooled at 10° C., then 14.60 ml. of methanesulfonic acid chloride and 15.6 ml. of dimethylformamide containing $SO_2$ (5% B.W.) are slowly added under stirring. The temperature is allowed to rise to about 35° C. under strong stirring. The temperature is subsequently lowered to 15° C. and 22 ml. of water are dropped into the mixture, which is then poured into 1500 ml. of ice-water containing 30 g. of sodium acetate. The precipitate is collected on a filter, washed with water and dried. Its weight is 20.64 g. (yield 94%), M.P. 153–157° C. The obtained product, which is $5\alpha$-pregn-9(11)-ene-$3\beta$ - ol-20-one-[$17\alpha$,$16\alpha$-d]-2'-methyloxazoline 3-acetate is dissolved (20.5 g.) in 400 ml. of methaol. A solution of 11 g. of KOH m. 110 ml. of water is then added under nitrogen. The mixture is refluxed for 10 minutes, then it is cooled to room temperature, and its pH is adjusted to 7–8 with 10% acetic acid. The solvent is evaporated in vacuo and the precipitate collected on filter, washed, dried and recrystallized from ethyl acetate: 14.2 g. (yield 80%) of $5\alpha$-pregn-9(11)-ene-$3\beta$-ol-20-one-[$17\alpha$,$16\alpha$-d]-2'-methyloxazoline are obtained, M.P. 212–214° C.

Said compound (10.53 g.) is dissolved in 79 ml. of anhydrous tetrahydrofuran and 79 ml. of methanol. Calcium oxide finely powdered (16 g.) and $\alpha,\alpha'$-azo-bis-isobutyronitrile (0.52 g.) are then added; the reaction is started at 25° C. after about half an hour using few drops of a solution of 10.53 g. of iodine in 52 ml. of anhydrous tetrahydrofuran and 32 ml. of methanol. The mixture is then cooled to 5–10° C. and is made to absorb the remaining iodine solution under strong stirring. After 2 hours no more free iodine is present and the solution is still clear. The solvent is evaporated in vacuo at 25° C. and the residue is extracted several times with methylene chloride, the obtained solution is washed with aqueous 2% sodium thiosulfate, then with water. The solvent is evaporated to dryness at room temperature and the crude compound is then dissolved in 58 ml. of acetone; this solution is added to a stirred mixture containing 96 ml. of triethylamine, 96 ml. of acetone and 58.2 ml. of glacial acetic acid. After one hour acetone is evaporated in vacuo and the product is precipitated using 800 ml. of water. The crude product is crystallized from ethanol and weighs 9.04 g. (yield 74%); it is $5\alpha$-pregn-9(11)-ene-$3\beta$, 21-diol-20-one-[$17\alpha$,$16\alpha$-d]-2'-methyloxazoline 21-acetate, M.P. 258–261° C.

One gram of the above compound, suspended in 50 ml. of stabilized acetone, is oxidized at room temperature with about 0.7 ml. of 8 N chromic acid. At the end the mixture is diluted with 50 ml. of water and the acetone is evaporated in vacuo. The precipitate is filtered, washed with water, dried. The product is crystallized from ethanol, yield 0.9 g. (90%), M.P. 205–210° C. It is $5\alpha$-pregna-9(11) - 21-ol-3,20-dione-[$17\alpha$,$16\alpha$-d] - 2'-methyloxazoline 21-acetate.

Eight grams of this compound are dissolved in 120 ml. of anhydrous dioxane and treated at 15° C. with few drops of a solution of 6.1 g. of bromine in 60 ml. of anhydrous dioxane. The reaction is started with 8 ml. of a solution containing 31% by weight of anhydrous hydrobromic acid in glacial acetic acid. At the end of said addition the solution is allowed to stand for 20 minutes at 20° C., then it is poured into 1500 ml. of ice-water containing 40 g. of potassium acetate. After 30 minutes the mixture is filtered, washed and dried at 40° C.: 10.3 g. of crude 2,4-dibromo-derivative are thus obtained, which are dissolved in 133 ml. of anhydrous dimethylformamide under nitrogen.

An amount of 3.25 g. of anhydrous lithium bromide and 6.53 g. of anhydrous lithium carbonate are added and the mixture is heated at 130° C. for 5 hours under stirring; then it is cooled and poured in 1000 ml. of ice-water. The product is extracted with cloroform, washed with water, dried and the solvent is distilled off in vacuo. The residue is acetylated at room temperature for 15 hours using 6 ml. of acetic anhydride in 20 ml. of pyridine. The mixture is poured into 150 ml. ice-water containing 15 ml. of concentrated hydrochloric acid, the product is collected, washed and dried; then it is dissolved in benzene and this solution is purified through a column of silicagel and using benzene with 1% B.W. of ethanol as eluting solvent. From the resulting solution 4 g. (yield 50%) of pregna - 1,4,9(11) - triene - 21 - ol - 3,20 - dione - [$17\alpha$,$16\alpha$-d]-2'-methyloxazoline 21-acetate are obtained, M.P. 197–198° C.

EXAMPLE 2

Pregna-1,4-diene-$9\alpha$-fluoro-$11\beta$,21-diol-3,20-dione-[$17\alpha$,$16\alpha$-d]-2'-phenyloxazoline To a solution of 1.17 g. of pregna-1,4,9(11)-triene-21-ol-3,20-dione-[$17\alpha$,$16\alpha$-d]-2'-phenyloxazoline 21-acetate in 10.2 ml. of tetrahydrofuran 5.45 ml. of 0.46 N perchloric acid are added followed by 0.467 g. of N-bromoacetamide in the dark. After stirring for 4 hours at 15° C. the solvent is removed in vacuo. Yield 1.48 g. of crude pregna - 1,4 - diene - $9\alpha$ - bromo - $11\beta$,21 - diol - 3,20-dione-[$17\alpha$,$16\alpha$-d]-2'-phenyloxazoline 21-acetate, M.P. 168–175° C.

To the above crude bromohydrin dissolved in 50 ml. of methanol 2.8 ml. of N NaOH are added at 0° C. in 10 minutes under a nitrogen atmosphere, followed by additional 2.8 ml. in 40 minutes. After 2 hours at 0° C. under stirring the mixture is made neutral by the addition of acetic acid. The methanol is distilled off and ice-water is added. The insoluble product (1 g.) is pregna-1,4-diene-$9\beta$,$11\beta$ - epoxy - 21 - ol - 3,20 - dione - [$17\alpha$,$16\alpha$-d] - 2'-phenyloxazoline, M.P. 146–147° C., $[\alpha]_D^{20}$—50.3° (c. 0.5, $CHCl_3$).

The above epoxide (580 mg.) is added to 4.7 ml. of a solution, cooled to 0° C., of 2.34 g. of HF in 4.23 ml. of tetrahydrofuran. After 1 hour at 0° C. the temperature is allowed to rise to 20° C. and the mixture is stirred for 5 hours. After addition of 10 ml. of tetrahydrofuran the mixture is cooled and 12 g. of $NaHCO_3$ and 0.41 g. of $Na_2SO_4$ are gradually added. The mixture is filtered, the precipitate is washed on the filter with 50 ml. of hot ethyl acetate and the combined filtrates are evaporated to dryness. The residue is recrystallized from benzene-hexane. Yield 500 mg., M.P. 181–183° C., $[\alpha]_D^{20}$—12.9° (c. 0.5, $CHCl_3$)

$E_{1\,cm.}^{1\%}$ 481, $\lambda$ max. 240–242

Preparation of the starting compound, pregna-1,4,9(11)-triene-21-ol-3,20-dione-[$17\alpha$,$16\alpha$-d]-2'-phenyloxazoline 21-acetate (1) $5\alpha$-pregnane-$3\beta$,$11\beta$-diol-20-one - [$17\alpha$,$16\alpha$-d] - 2'-phenyloxazoline 3-benzoate.—To an amount of 51 g. of 5α-pregnane-3β-ol-11,20-dione-[17α,16α-d]-2′-phenyloxazoline 3-benzoate dissolved in a mixture of 1240 ml. of methanol and 200 ml. of chloroform, a solution of 29.7 g. of semicarbazide hydrochloride in 178 ml. of water and 20 ml. of pyridine is added at 60° C. The solution is refluxed for 5 hours, then the solvent is evaporated under reduced pressure until the volume has reached 300 ml. Ice-water is added (1 liter) and the formed precipitate is recovered, washed with water and dried. The 20-semicarbazone thus obtained melts at 220–225° C. and weighs 57 g. An amount of 11.05 g. of the above product are dissolved in 206 ml. of ethanol and treated with 32 ml. of 10% solution of sodium bicarbonate in water at 60–70° C. under a nitrogen stream. Sodium borohydride (2.09 g.) is then added in small amounts, and the mixture is refluxed for half an hour after the end of the addition. Another amount (2.09 g.) is added, and then the solution is refluxed for 90 minutes. The temperature is allowed to go down to 10° C., the solution is neutralized with 10% acetic acid, the solvent is removed in vacuo and to the thus obtained suspension 200 ml. of water are added. The precipitate is the 11β-hydroxy-20-semicarbazone derivative, of which 11.05 g. are collected, M.P. 275–285° C. A quantity of 11 g. of this product dissolved in 100 ml. of methanol is refluxed with 10% hydrochloric acid for 1 hour. The solvent is removed under reduced pressure and neutralized after cooling, with 10% sodium hydroxide. The 5α-pregnane-3β-11β-diol-20-one-[17α,16α-d]-2′-phenyloxazoline 3-benzoate which precipitates, is collected on filter, washed and dried; yield 28.53 g., M.P. 203–205° C. $[\alpha]_D$+26.3 (c. 0.5, $CHCl_3$).

(2) 5α-pregn-9(11)-ene - 3β-ol-20-one-[17α,16α-d]-2′-phenyloxazoline 3-benzoate.—A solution of 43 g. of 5α-pregnane - 3β,11β - diol - 20-one-[17α,16α-d]-2′-phenyloxazoline 3-benzoate in 290 ml. of dimethylformamide and 96.7 ml. of collidine is cooled to 10° C., then 25 ml. of methanesulfonic acid chloride and 32 ml. of dimethylformamide containing 6% B.W. of $SO_2$ are slowly added under strong stirring. The temperature is allowed to go up to 32–34° C. for 10 minutes, then it is again lowered and 45 ml. of water are slowly added. The reaction mixture is poured under stirring in 3200 ml. of water at 80° C; after cooling the precipitate is collected on a filter and washed with water; 36 g. of 9(11)-pregnene are obtained, M.P. 115–120° C.

(3) 5α-pregn-9(11)-ene-3β-ol-20 - one-[17α,16α-d]-2′-phenyloxazoline.—An amount of 35 g. of 5α-pregn-9(11)-ene-3β-ol-20-one-[17α,16α-d]-2′-phenyloxazoline 3-benzoate are dissolved at the boiling temperature in a mixture of 700 ml. of methanol, 100 ml. of water and 20 g. of potassium hydroxide. After 60 minutes the solvent is removed and the solution is neutralized with dilute acetic acid. The obtained precipitate (28 g.) has M.P. 150–155° C.

(4) 5α-pregn-9(11)-ene-3β,21-diol-20-one-[17a,16α-d]-2′-phenyloxazoline 21-acetate.—An amount of 17.24 g. of 5α-pregn-9(11)-ene - 3β-ol-20-one-[17α,16α-d]-2′-phenyloxazoline is dissolved in 700 ml. of chloroform and is treated with 34.5 ml. of 24% hydrobromic acid dissolved in acetic acid. To this mixture 6.36 g. of bromine dissolved in 70 ml. of chloroform are added through 40 minutes under stirring at 20° C. After adding bromine the mixture is allowed to stand for 10 minutes, then it is washed with a cold solution of sodium bicarbonate until a neutral pH is reached, dried over sodium sulfate and the solvent is distilled off, thus obtaining a residue weighing 20.96 g. This product is dissolved in 509 ml. of acetone and heated to boiling temperature under strong stirring while a solution of 36.19 g. of potassium acetate in 36.19 ml. of water is added together with a very small quantity of iodine. The mixture is refluxed for 6 hours. The previously added acetone is then eliminated in vacuo and 500 ml. of water are added. A product crystallizes out and is recovered by filtration: it is the 21-ol-21-acetate derivative (16.33 g.), M.P. 132–134° C., $[\alpha]_D$ —17.4 (c. 0.5, $CHCl_3$), $E_{1cm}^{1\%}$ 261 per λ max. 248–250 mμ (in methanol)

This same compound can be obtained also through the 21-iododerivative and subsequent reaction of same with glacial acetic acid.

(5) 5α-pregn-9(11)-ene-21-ol-3,20-dione-[17α,16α-d]-2′-phenyloxazoline 21-acetate.—To a solution of 9.4 g. of 5α-pregn-9(11)-ene-3β,21-diol-20-one-[17α,16α-d]-2′-phenyloxazoline 21-acetate in 300 ml. of acetone about 6 ml. of 8 N chromic acid are added dropwise and under strong stirring. The final suspension is diluted with ice-water and the organic solvent is evaporated in vacuo. By filtration 8.4 g. of the 3-oxo-derivative are obtained, M.P. 115–120° C.

(6) Pregna - 1,4,9(11)-triene-21 - ol - 3,20 - dione-[17α,16α-d]-2′-phenyloxazoline 21-acetate.—A solution of 25% hydrobromic acid in acetic acid and then (through 2 hours) 6.28 g. of bromine dissolved in 60 ml. of dioxane are added under stirring and at room temperature, to a solution of 9.35 g. of 5α-pregn-9(11)-ene-21-ol-3,20-dione-[17α,16α-d]-2′ - phenyloxazoline 21-acetate in dioxane. After half an hour the mixture is poured into another solution of 50 g. of potassium acetate in 2000 ml. of ice-water. The precipitate is collected, washed and dried, then it is dissolved in 130 ml. of dimethylformamide, and after heating at 130° C. 3.13 g. of lithium bromide and 6.28 g. of lithium carbonate are added under stirring in a nitrogen stream. After 3 hours the mixture is poured into ice-water, and extracted with ethyl acetate. The obtained solution is washed with water, then the solvent is evaporated to dryness. The residue is chromatographically purified using silicagel (100 g.) and benzene:ethyl acetate (95:5) as eluting solvent. The residue obtained by evaporation of the solvent is further purified by crystallization from ligroin: It weighs 5 g., M.P. 191–194° C., $[\alpha]_D$ —98.1 (c. 0.5, $CHCl_3$), $E_{1cm}^{1\%}$ 561.5, λ max. 240–242 mμ (in methanol)

EXAMPLE 3

Pregna-1,4-diene-9α-fluoro-11β,21-diol-3,20-dione-[17α,16α-d]-2′-butyloxazoline

A solution of 4.74 g. of pregna-1,4,9(11)-triene-21-ol-3,20-dione-[17α,16α-d]-2′-butyloxazoline 21-acetate in 44 ml. of tetrahydrofuran is reacted at 15° C. under stirring with 23 ml. of 0.46 N perchloric acid. The mixture is kept out of light and 1.97 g. of N-bromoacetamide are added at 10–15° C. After 1 hour the excess N-bromoacetamide is destroyed by the addition of sodium bisulfite, the organic solvent is evaporated in vacuo and the precipitate is washed with cold water. The obtained product weighs 5.7 g., M.P. 155–158° C.

An amount of 2.5 g. of the obtained 9α-bromo-pregna-1,4-diene-11β,21 - diol-3,20 - dione-[17α,16α-d]-2′-butyloxazoline 21-acetate is dissolved in 120 ml. of a mixture of methanol-chloroform (3:2) and treated at 0° C. with 9.30 ml. of 1 N sodium hydroxide within 40 minutes. The mixture is stirred for 2 hours with external cooling, then it is neutralized with acetic acid and the organic solvent is evaporated in vacuo, and substituted with water; an extraction is made with chloroform and the obtained solution is washed, dried and evaporated in vacuo. The residue is crystallized from acetone-hexane (1.85 g.) and melts at 135–138° C., $[\alpha]_D$+16.5° (c. 0.5, $CHCl_3$).

An amount of 0.75 g. of the obtained pregna-1,4-diene-9β,11β-epoxy-21 - ol - 3,20 - dione-[17α,16α-d]-2′-butyloxazoline is added to 6 ml. of tetrahydrofuran containing 3.27 g. of hydrogen fluoride. The mixture is stirred for 1 hour at 0° C. and subsequently for 5 hours at room temperature, then it is poured into 15 ml. of tetrahydrofuran and neutralized with sodium bicarbonate. The formed inorganic salts are filtered off and the obtained solution is concentrated to dryness. The residue is chromatographically purified on silicagel (5 g.) and using benzene:ethyl acetate (1:1) as the eluting solvent; it yields 0.64 g. of the substance, M.P. 120–125° C., $[\alpha]_D +0.7°$ (c. 0.5, $CHCl_3$).

Preparation of the starting compound, pregna-1,4,9(11)-triene-21-ol-3,20 - dione-[17α,16α-d]-2″-butyloxazoline 21-acetate.

(1) 5α-pregna-3β,11β-diol-20-one-[17α,16α-d]-2′-butyloxazoline.—An amount of 115 g. of 5α-pregnane-3β-ol-11,20-dione-[17α,16α-d]-2′-butyloxazoline 3-valerate is dissolved in methanol and the solution is heated to boiling temperature; 540 ml. of water, 62.2 ml. of pyridine and 88 g. of semicarbazide hydrochloride are then added. The mixture is refluxed for 5 hours, then, after evaporation of methanol, it is poured into 3500 ml. of water. A precipitate is formed: it is the 20-semicarbazide derivative, which weighs 117 g. and has M.P. 229–232° C., $$[\alpha]_D +43.2 \ (c. \ 0.5, \ CHCl_3)$$

Sixty grams of the above compound dissolved in 1200 ml. of ethanol are heated at 60–70° C. and to this solution another solution of 18.8 g. of $KHCO_3$ in 18.8 ml. of water is added under a nitrogen stream. Then 14.4 g. of sodium borohydride are carefully added to the boiling mixture. After boiling for 90 minutes the mixture is cooled and its pH is made neutral with 10% acetic acid. Ethanol is distilled off, water is added and an extraction is carried out with chloroform. The product is scarcely soluble in chloroform, so that at last it crystallizes out; weight 58 g., M.P. 235–238° C. It is the 11β-hydroxy-derivative.

A solution of the above product (2 g.) in 220 ml. of methanol and 220 ml. of 10% hydrochloric acid is refluxed for 90 minutes. Ethanol is then distilled off and the resulting solution is cooled and made alkaline with 10% sodium hydroxide. An amount of 21 g. of 5α-pregnane - 3β,11β - diol - 20 - one - [17α,16α-d] - 2′ - methyloxazoline is obtained, M.P. 120–125° C.

(2) 5α - pregnane-3β,11β-diol-20-one-[17α,16α - d] - 2′-butyloxazoline - 3 - acetate.—A mixture of 28.2 g. of 5α-pregnane-3β,11β-diol-20-one-[17α,16α-d]-2′ - butyloxazoline, 100 ml. of pyridine and 28.2 ml. of acetic anhydride is heated on a water bath for 45 minutes. The mixture is then poured in ice-water containing 100 ml. of concentrated hydrochloric acid. A precipitate is formed, which is repeatedly washed with water and dried. The aqueous solution is chromatographically purified using silicagel and benzene containing 5% of acetone as the eluting solvent. By evaporation of the solvent another amount of product is obtained: total yield 22 g.; M.P. 143–145° C.; $[\alpha]_D +60.6 \ (c. \ 0.5\%; \ CHCl_3)$.

(3) 5α - pregn - 9(11) - one - 3β - ol - 20 - one - [17α,16α-d]-2′-butyloxazoline-3-acetate.—An amount of 17.34 g. of 5α - pregnane - 3β,11β - diol-20-one-[17α,16α-d]-2′-butyloxazoline-3-acetate is dissolved in 93.2 ml. of dimethylformamide and 30.9 ml. of collidine. To this solution are added 10.45 ml. of methanesulphonic acid chloride at a temperature of 10° C., then 8.4 ml. of dimethylformamide containing $SO_2$ (6% B.W.). The temperature is now allowed to rise up to 35° C.; the mixture is stirred for 10 minutes, then it is cooled and poured into 1000 ml. of ice-water containing 10 g. of sodium acetate. An extraction is made with $CHCl_3$ and the obtained solution is dried over sodium sulfate, it is filtered and the solvent is removed. The oily product thus obtained weighs 17.79 g. and is 5α-pregn-9(11)-ene-3β-ol-20-one-[17α,16α-d]-2′-butyloxazoline-3-acetate.

(4) 5α - pregn - 9(11) - ene - 3β - ol - 20 - one - [17α, 16α-d]-2′-butyloxazoline.—An amount of 17.79 g. of 5α-pregn-9(11)-ene-3β-ol-20-one-[17α,16α-d]-2′ - butyloxazoline-3-acetate dissolved in 300 ml. of methanol are heated to reflux, then a solution of 4.86 g. of KOH in 80 ml. of water is added. The mixture is allowed to boil for 10 minutes, then the organic solvent is distilled off and the resulting solution is neutralized with $CH_3COOH$. After extraction with chloroform and evaporation of the solvent the residue is taken up with ethanol and precipitated by diluting with water. Yield 14 g., M.P. 90–93° C. $[\alpha]_D +48.6 \ (c. \ 0.5\%; \ CHCl_3)$.

(5) 5α - pregn - 9(11) - ene - 3β,21 - diol-20-one-[17α, 16α-d]-2′-butyloxazoline - 21 - acetate.—To a quantity of 9.74 g. of 5α-pregn-9(11)-ene-3β-ol-20-one-[17α,16α-d]-2′-butyloxazoline dissolved in 290 ml. of chloroform, 19.5 ml. of a solution of 24% hydrobromic acid in acetic acid and 4.15 g. bromine in 39 ml. of $CHCl_3$ are added. The mixture is then made neutral with sodium bicarbonate, the chloroform layer is separated to dryness in vacuo. The residue is the 21-bromo-derivative, and it is dissolved in 48 ml. of acetone which is added to a boiling solution of the following composition: triethylamine 79.5 ml., acetone 79.5 ml., glacial acetic acid 48 ml. After 1 hour's refluxing the organic solvent is removed in vacuo and 200 ml. of water are added. The product is extracted with chloroform and crystallized from isopropyl-ether: it is the 21-acetate, weight 7.79 g., M.P. 176–179° C., $[\alpha]_D +10.7 \ (c. \ 0.5\%; \ CHCl_3)$.

(6) 5α - pregn - 9(11) -ene-21-ol-3,20-dione-[17α,16α-d]-2′-butyloxazoline-21-acetate.—A solution of 30 g. of 5α - pregn - 9(11) - ene - 3β,21-diol-20-one-[17α,16α-d]-2′-butyloxazoline - 21 - acetate in 1300 ml. of acetone is oxidized at room temperature by a volume of 20 ml. of a solution of 8 N chromic acid in sulfuric acid. The mixture is then diluted with 1500 ml. of ice-water, and almost all the organic solvent is evaporated off. An extraction with chloroform, which is subsequently removed, yields a product which is taken up with diethyl ether. By evaporating the solvent 16.65 g. of the 3-oxoderivative are obtained, M.P. 170–174° C., $[\alpha]_D +27.2 \ (c. \ 0.5\%, \ CHCl_3)$.

(7) Pregna - 1,4,9(11) - triene-21-ol-3,20-dione-[17α, 16α-d]-2′-butyloxazoline-21-acetate.—A solution of 8.36 g. of 5α-pregn-9(11)-ene-21-ol-3,20-dione-[17α,16α-d]-2′-butyloxazoline-21-acetate in 110 ml. of dioxane, containing 8.36 ml. of a solution of 24% hydrobromic acid in acetic acid, is reacted within 60 minutes with 5.68 g. of bromine dissolved in 57 ml. of acetic acid. The mixture is allowed to stand for 45 minutes, then it is poured into 1000 ml. of water containing potassium acetate (35 g.), and filtered, thus obtaining 10.7 g. of 2,4-dibromoderivative. This compound is dissolved in 42 ml. of dimethylformamide, and added to a suspension of 3.15 g. of lithium bromide and 6.36 g. of lithium carbonate in 87 ml. of dimethylformamide, stirred and heated to 130° C. under nitrogen stream for 4 hours, then it is cooled and poured into ice-water. An extraction with chloroform yields the required compound which is recrystallized from acetone-hexane; its weight is 8 g. M.P. 127–131° C.; $[\alpha]_D -37.9 \ (c. \ 0.5\%, \ CHCl_3)$.

EXAMPLE 4

Pregna-1,4-diene-9α-fluoro-11β-ol-3,20-dione-[17α, 16α-d]-2′-methyloxazoline

To a solution of 6 g. of pregna-1,4,9(11)-triene-3,20-dione-[17α,16α-d]-2′-methyloxazoline in 70 ml. of tetrahydrofuran, 37.5 ml. of 0.46 N $HClO_4$ are added at 10–15° C. The reaction vessel is kept out of light and 3.21 g. of N-bromoacetamide are added, the mixture is stirred for 1 hour at 10–15° C., it is decoloured with a saturated solution of sodium bisulfite, the organic solvent is removed in vacuo. The residue is taken up with ice-water (50 ml.) and the 9α-bromo-11β-hydroxy derivative is isolated by filtration (7.5 g.); M.P. 175–178° C.

This product is dissolved in 400 ml. of methanol and 165 ml. of chloroform; to this solution 20 ml. of 1 N NaOH are slowly added at 0° C. under a nitrogen stream and the mixture is stirred for 2 hours at 0°–4° C. After neutralising with acetic acid, the organic solvent is evaporated in vacuo and ice water is added, thus separating 5 g. (yield 78%) of the crystalline 9β-11β-epoxy compound; M.P. 266–267° C.; $[\alpha]_D = +47.6 \ (CHCl_3)$.

An amount of 16 g. of the above prepared 9β,11β-epoxy-pregna-1,4-diene-3,20-dione-[17α,16α-d] - 2′-methyloxazoline is added at 0° C., to 15.7 ml. of a solution prepared by collecting 7.8 g. hydrofluoric acid in 14 ml. of anhydrous tetrahydrofuran. The mixture is then stirred for half an hour at 0° C. and subsequently for 5 hours at room temperature, then it is poured into a vessel containing 40 ml. of tetrahydrofuran and neutralised by 40 g. of sodium bicarbonate and 1.5 g. of sodium sulfate at 5° C. The inorganic mass is collected on filter, it is washed with hot ethyl acetate, and the filtrate is evaporated in vacuo. An amount of 1.13 g. (yield 67%) of pregna-1,4-diene-9α - fluoro-11β-ol-3,20-dione-[17α,16α-d]-2′-methyloxazoline is obtained by recrystallization from acetone; M.P. 296–298° C.; $[α]_D = +96.6$ (CHCl$_3$).

Preparation of the starting compound, pregna-1,4,9(11)-triene-3,20-dione-[17α,16α-d]-2-methyloxazoline (1) To a solution of 50 g. of 5α-pregn-9(11)-ene-3β-ol-20-one-[17α,16α-d]-2′-methyloxazoline in 1500 ml. of acetone an 8 N solution of chromic acid sufficient to oxidize the 3β-hydroxy group is added dropwise, at room temperature and under strong stirring. By evaporating the organic solvent and adding water 44 g. of the 3-keto compound are recovered; yield 88%; M.P. 205–207° C.; $[α]_D = +74.7$ (CHCl$_3$).

(2) An amount of 10 g. of the above prepared 5α-pregn-9(11)-ene - 3,20 - dione-[17α,16α-d]-2′-methyloxazoline dissolved in a mixture obtained by mixing 180 ml. of dioxane and 10 ml. of 25% hydrobromic acid in acetic acid, is treated through 45 minutes with a solution of 8.8 g. of bromine dissolved in 80 ml. of dioxane, at room temperature. After half an hour the mixture is poured into another solution of 50 g. of potassium acetate in 2000 ml. of ice water, an amount of 14 g. of 2,4-dibromo-derivative is obtained, which is subsequently dissolved in 180 ml. of dimethylformamide. To the obtained solution 4.5 g. of lithium bromide and 8.5 g. of lithium carbonate are added, the mixture is heated at 135° C. for 4 hours, then it is poured into ice water: the obtained solution is extracted several times with ethyl acetate. By evaporating the solvent 9.4 g. of the corresponding 1,4,9(11)-pregnatriene are obtained. It can be purified through silicagel using benzene-ethyl acetate as eluant. Yield 6.1 g. (60%), M.P. 250–253° C. (from methanol); $[α]_D$ —10.6° (CHCl$_3$), $E_{1\ cm.}^{1\%}$ 4.22 at λ max. 238-240 mμ

EXAMPLE 5

Pregna-1,4-diene-9α-fluoro-11β,21-diol-3,20-dione-[17α,16α-d]-oxazoline

To a suspension of 3 g. of pregna-1,4,9(11)-triene-21-ol-3,20-dione-[17α,16α-d]-oxazoline 21-acetate in 50 ml. of tetrahydrofuran 16.7 ml. of HClO$_4$ 0.46 N are gradually added with stirring. After addition of 1.3 g. of N-bromoacetamide the mixture is stirred for 2 hours in the dark, decolorized with sodium sulfite, diluted with 50 ml. of water and the organic solvent is distilled off. The solid is collected and dried. It is pregna-1,4-diene-9α-bromo-11β,21-diol-3,20-dione 21-acetate, M.P. 157–161° C.; yield 3.5 g.

To a solution, stirred at 0° C., of 3.4 g. of the above 9α-bromo-11β-hydroxy derivative in 100 ml. of methanol and 30 ml. of dichloromethane 16.1 ml. of N NaOH are added in 30 minutes. After stirring for 2 hours at 0° C. acetic acid is added to neutral reaction, then 50 ml. of water are added and the organic solvent is evaporated in vacuo to a volume of about 20 ml. and the residue is poured into ice water (150 ml.). The precipitate is collected, washed with water and dried. Yield 2.5 g. of pregna - 1,4 - diene - 9β,11β - epoxy - 21 - ol - 3,20 - dione-[17α,16α-d]-oxazoline, M.P. 205–208° C., $[α]_D$ 71.6. An amount of 1 g. of said product is treated with hydrogen fluoride in tetrahydrofuran exactly as described in the preceding example. Yield 0.6 g. of pregna-1,4-diene-9α-fluoro-11β,21-diol - 3,20 - dione-[17α,16α-d]-oxazoline, M.P. 254–257° C.; $[α]_D$ +146.8 (c. 0.5, CH$_3$OH).

Preparation of the starting compound

A suspension of 100 g. of 5α-pregnane-3β-ol-11,20-dione-[17α,16α-d]-oxazoline 3 formate having M.P. 177–179° C., and $[α]_D$ +98.2° (c. 0.5, CHCl$_3$), and 10 g. of anhydrous pyridine hydrochloride in 3200 ml. of ethylene glycol is slowly (5 hours) distilled in vacuo at such a rate that the vapors have a temperature of about 85–90° C., up to a residual volume of 400 ml. This residue is cooled, neutralized with aqueous NaHCO$_3$ and diluted with 3200 ml. of water. The precipitate is collected and dried. Yield 98 g. of 5α-pregnane-3β-ol-11,20-dione-[17α,16α-d]-oxazoline 20-ethylene ketal, M.P. 230–233° C. (from ethyl acetate), $[α]_D$ 100.6° (c. 0.5, CHCl$_3$).

To a mixture of 95 g. of the above product and 2800 ml. of ethanol, heated to 60°, a solution of 42.5 g. of KHCO$_3$ in 425 ml. of water is added with stirring. The mixture is heated to about 85° C., then 38 g. of sodium borohydride are gradually added, the mixture is refluxed for 2 hours, cooled to 10° C. and neutralized with acetic acid. The solvent is removed and 2000 ml. of ice water are added to the residue. Yield 87.4 g. of 5α-pregnane-3β,11β-diol-20-one-[17α,16α-d]-oxazoline 20-ethylene ketal, M.P. 255–257° C. (from ethanol), $[α]_D$ +96.1 (c. 0.7, CH$_3$OH).

To a solution of 80 g. of the above ketal in 800 ml. of acetic acid, heated at 95° C., 640 ml. of water are added and heating is continued for 30 minutes. After heating 8000 ml. of ice water are added. The precipitate (65 g.) is 5α-pregnane-3β,11β-diol-20-one-[17α,16α-d]-oxazoline, M.P. 249–252° C., $[α]_D$ +135.5° (c. 0.7, CH$_3$OH).

The 3β-acetate of the above compound is prepared by treatment with acetic anhydride at room temperature. From 78 g., yield 80 g., M.P. 210–212° C. (from methanol), $[α]_D$ +105.2° (c. 1, CHCl$_3$).

A solution of 7.5 g. of the 3β-acetate in 45 ml. of dimethylformamide and 15 ml. of collidine is cooled to 10° C. and treated with 4.7 ml. of methanesulfonic acid chloride, followed by 1.9 ml. of dimethylformamide containing 6% of SO$_2$ under vigorous stirring. The temperature is allowed to rise to 35° C., then the mass is cooled and 5.5 ml. of water are added dropwise. The mixture is then poured into 500 ml. of ice water containing 10 g. of sodium acetate. The precipitate is pregn-9(11)-ene-3β-ol-20-one-[17α,16α-d]-oxazoline 3-acetate: yield 69 g., M.P. 140–141° C. (ethanol), $[α]_D$ 62.1° (c. 0.5, CHCl$_3$).

The above acetate is deacylated by boiling with potassium hydroxide in methanol-water. From 4.5 g., yield 3.95 g., M.P. 196–197° C. (ethanol), $[α]_D$ 73.7 (c. 0.5, CHCl$_3$).

To a solution of 15.7 g. of pregn-9(11)-ene-3β-ol-20-one-[17α,16α-d]-oxazoline in 120 ml. of tetrahydrofuran and 120 ml. of methanol 24 g. of CaO and 0.8 g. of α,α′-aza-bis-isobutyronitrile are added, followed by the dropwise addition of a solution of 15.7 g. of iodine in 80 ml. of tetrahydrofuran and 50 ml. of methanol. Dichloromethane (800 ml.) is then added and the mixture is filtered. The filtrate is washed with aqueous sodium bisulfite, then with water and evaporated to dryness in vacuo. The residue, dissolved in 80 ml. of acetone, is added to a stirred mixture, heated to about 50° C., of 140 ml. of triethylamine, 140 ml. of acetone and 80 ml. of acetic acid. After refluxing for 1 hour the acetone is distilled off in vacuo and 1000 ml. of ice water are added. Yield 15 g. of 5α-pregn-9(11)-ene-3β,21-diol-20-one-[17α,16α-d]-oxazoline 21-acetate, M.P. 196–198° C., $[α]_D$ +37.9° (c. 0.5, CHCl$_3$).

A solution of 11.75 g. of the above product in 400 ml. of acetone is oxidized at 20° C. with 11 ml. of aqueous 8 N chromic acid. By dilution with water 10 g. of 5α-pregn - 9(11) - ene-21-ol-3,20-dione-[17α,16α-d]-oxazoline 21-acetate are obtained, M.P. 228–230° C. (ethyl acetate), $[\alpha]_D$ +53.9° (c. 0.5, CHCl₃).

To a solution of 8.5 g. of the above product in 140 ml. of dioxane 1.7 ml. of 25% HBr in acetic acid are added with stirring, followed in 1 hour at 25° C. by 6.77 g. of bromine in 70 ml. of dioxane. The mixture is poured into 1700 ml. of ice water containing 35 g. of potassium acetate. The solid is collected, washed, dried and dissolved in 150 ml. of dimethylformamide. The solution is heated 5 hours at 135° C. with 3.6 g. of lithium bromide and 7.2 g. of lithium carbonate, then it is poured into 1200 ml. of water. After adjusting the pH to 7–8 with HCl the mixture is extracted with ethyl acetate. Evaporation of the solvent to a volume of about 50 ml. gives a precipitate, which is collected and dried. Yield 5 g. of pregna-1,4,9(11)-triene-21-ol-3,20-dione-[17α,16α-d]-oxazoline 21-acetate, M.P. 253–255° C. (acetone); $[\alpha]_D$ 0° (c. 0.5, CHCl₃);

$E_{1\,cm}^{1\%}$ 380.6 λ max. 238–240 mμ (CH₃OH)

We claim:
1. A steroido-oxazoline of the formula

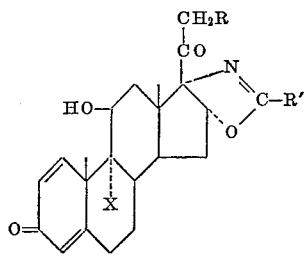

wherein R is a member of the class consisting of hydrogen, hydroxy and acyloxy, R' is a member of the class consisting of hydrogen, lower alkyl and phenyl, X is a member of the class consisting of fluorine and bromine.

2. Pregna-1,4-diene-9α-bromo-11β,21-diol-3,20-dione-[17α,16α-d]-2'-methyloxazoline.
3. Pregna-1,4-diene-9α-fluoro-11β,21-diol-3,20-dione-[17α,16α-d]-2'-methyloxazoline.
4. Pregna-1,4-diene-9α-bromo-11β,21-diol-3,20-dione-[17α,16α-d]-2'-butyloxazoline.
5. Pregna-1,4-diene-9α-fluoro-11β,21-diol-3,20-dione-[17α,16α-d]-2'-butyloxazoline.
6. Pregna-1,4-diene-9α-bromo-11β-ol-3,20-dione-[17α,16α-d]-2'-methyloxazoline.
7. Pregna-1,4-diene-9α-fluoro-11β-ol-3,20-dione-[17α,16α-d]-2'-methyloxazoline.

References Cited

UNITED STATES PATENTS 2,838,498  6/1958  Magerlein et al.

OTHER REFERENCES

Hirschmann et al., Journ. Amer. Chem. Soc., vol. 84, (1962) pp. 1270–78.
Djerassi, Steroid Reactions, Holden-Day, 1963, p. 156.
Winternitz et al., Steroids, December 1965, pp. 805–840, p. 811 pertinent.

LEWIS GOTTS, Primary Examiner
E. G. LOVE, Assistant Examiner

U.S. Cl. X.R.
260—999